United States Patent Office 3,131,152
Patented Apr. 28, 1964

3,131,152
FOAM PRODUCING FORMULATIONS
Kenneth Klausner, Belleville, N.J., assignor to Allied Chemical Corporation, New York, N.Y., a corporation of New York
No Drawing. Filed June 13, 1960, Ser. No. 35,408
8 Claims. (Cl. 252—305)

The present invention relates to the production of self-propelling homogeneous liquid formulations which, when dispensed in a suitable aerosol container, produce foams of limited stability.

Numerous self-propelling liquid formulations are available commercially. These formulations, when dispensed, produce either stable foams or atomized sprays. The formulations producing stable foams are useful, for example, as shaving or shampoo lathers. The formulations producing atomized sprays find utility as after-shave lotions, cold-wave lotions, nail polish removers, etc. Although extensively used, the latter formulations, because of the relatively uncontrolled dispension of atomized sprays may cause physical or property damage. Moreover, these formulations are marketed in the form of emulsions which require shaking before dispensing.

I have now developed a self-propelling homogeneous liquid formulation which, when dispensed in an aerosol container provided with a foam-dispensing head, forms a foam of limited stability. This formulation comprises a saturated aliphatic monohydric alcohol containing 1 to 3 carbon atoms, preferably ethyl alcohol, water, a surfactant and a propellant in certain highly critical proportions.

By a foam of limited stability, I mean a foam which does not become completely liquefied when exposed to the atmosphere for at least about 15 minutes, preferably at least about an hour, but, when disturbed, as by rubbing, reverts quickly, i.e. within about 2 seconds, to a liquid.

As indicated above, commercially available formulations producing atomized sprays may be injurious as a result of the uncontrolled dispension of the sprays. Thus, upon application of a cold-wave formulation to the head, the spray may get in the eyes of the user. Further, when a formulation for removing nail polish is employed, the spray may settle on near-by furniture and remove the finish. Numerous other known formulations, when dispensed as atomized sprays, may cause similar detrimental effects.

The self-propelling liquid formulations of this invention enable the user to quickly and conveniently dispense a desired amount to a restricted area in a way impossible with conventional aerosol sprays. For example, when used as a cold-wave lotion, the dispensed foam can be applied directly to the head. Upon application of a comb or brush, the foam quickly reverts to a liquid and is spread over the desired area with ease. When used as a nail polish remover, a small drop of the dispensed foam is placed on each fingernail. When the foam is rubbed with a cleansing tissue, it becomes a liquid and removes the polish. Similar success may be attained by application as foams of such diversified products as after-shave lotions, astringents, colognes, hair-coloring tints, hair dressings, skin refresheners, sun screen lotions, toilet water preparations, shoe polishes, furniture polishes, acne preparations, dandruff preparations, etc.

A further advantage of the formulations of the present invention is that they are clear, homogeneous liquids. As a result, unlike commercially available products, the formulations require no shaking before dispensing and, moreover, may be attractively packaged in transparent containers.

Still further, the formulations, when dispensed in the form of foams of limited stability, possess the advantage over commercially available products of avoiding premature evaporation of volatile components.

The self-propelling homogeneous liquid formulations of the present invention are composed of the following critical ratio of ingredients.

| Ingredients: | Weight percent |
| --- | --- |
| Alcohol | 46 to 66 |
| Water | 28 to 42 |
| Surfactant | 0.5 to 5 |
| Propellant | 2 to 15 |

The surfactant, which must be soluble in either the alcohol or water but not in both, may be anionic, non-ionic or cationic in character. Non-ionic surfactants, and particularly surfactants formed by reaction of fatty alcohols and ethylene oxide (polyoxyethylated fatty alcohols), such as polyoxyethylene stearates, are preferred. Other non-ionic surfactants include alkyl phenoxy polyoxyethylene ethanols, such as nonyl phenoxy polyoxyethylene ethanol, and glyceryl esters, such as glyceryl monostearate, diglycol laurate and diglycol oleate. Suitable anionic surfactants include sulfated fatty alcohols, such as sulfated cetyl alcohol and stearyl alcohol, and sulfated fatty acids, such as sulfated stearic acid, palmitic acid, oleic acid and coconut oil fatty acids. Quaternary ammonium salts are typical of suitable cationic surfactants.

Any volatile organic material that exists as a gas at room temperature, exists mainly as a liquid at room temperature and elevated pressure and is soluble in either the alcohol or water but not in both may be used as propellant. Saturated aliphatic hydrocarbons and halogenated (e.g. fluorinated) saturated aliphatic hydrocarbons having vapor pressures within the range of about 5 to 300 p.s.i.g., preferably about 10 to 85 p.s.i.g., at 70° F. are typical of the propellants which may be used in this invention. The chlorofluorinated saturated aliphatic hydrocarbons, such as dichlorodifluoromethane, monochlorodifluoromethane, dichlorotetrafluoroethane, trichlorotrifluoroethane, difluoroethane, difluoromonochloroethane, and mixtures thereof, have been found to be particularly suitable propellants.

The amount of propellant employed varies within the range given above with the density of the propellant. Thus, the propellant should be added in such amount as to constitute about 2.3 to 29.5% by volume of the liquid formulation, and preferably about 3.3 to 16.5% by volume of the formulation. This requirement is met, for example, by use of chlorofluorinated saturated aliphatic hydrocarbons in amounts ranging from 3 to 15% by weight of the formulation. In the case of saturated aliphatic hydrocarbons of lower density, such as propane, isobutane, n-butane, isopentane and n-pentane, an amount ranging from 2 to 10% by weight of the formulation should be used.

Although any saturated aliphatic monohydric alcohol containing 1 to 3 carbon atoms, such as ethyl alcohol, n-propyl alcohol, isopropyl alcohol, etc., may be used in the formulations of the present invention, I prefer to use ethyl alcohol.

Part of the alcohol component, for example, up to about 65% by weight thereof may be replaced with acetone, if desired. Acetone is advantageously used in the production of nail polish remover formulations where acetone's characteristic solvent power is desired. Moreover, up to 100% of the water component may be replaced with glycerine.

Use of decreasing amounts of alcohol and increasing amounts of water within the aforementioned ranges favors the formation of more stable foams. If, however, amounts of alcohol and water outside the indicated critical ranges are employed, emulsified instead of homogeneous formulations are obtained.

Depending on the nature of the product desired, the formulations may contain various additives which are soluble therein, including perfumes, medicinal substances, lubricants, resins, waxes, aldehydes, ketones, petroleum hydrocarbons, ethers, menthol, camphor, etc.

In order to obtain the desired foam of limited stability, it is necessary that the formulation be dispensed in an aerosol container provided with a foam-dispensing head. A typical foam-dispensing head comprises a spout fixture adapted to be permanently mounted and rigidly supported upon the aerosol container in cooperative relation with the stem of a dispensing valve which controls the flow of material from such container. The spout fixture includes a spout through which the material may be delivered and also a valve-operating plunger mounted on a diaphragm and normally maintained in a position to insure closing of the dispensing valve. Associated with the spout fixture is an activator mounted for sliding movement from a retracted position to an advanced position or vice versa. It is so constituted that when slid into advanced position, it may be engaged by the plunger of the spout fixture to actuate the valve stem and dispense the pressurized material through the spout in the form of foam. If desired, a dip tube may be provided for delivering the formulation from the inside of the container to the dispensing valve. This type of foam-dispensing head is described in greater detail in U.S. Patent 2,678,147 of May 11, 1954. Other types of foam-dispensing heads are available and may also be used in practice of this invention.

When the formulations of this invention are confined in an aerosol container, such as that described above, an internal pressure in the range of about 10 to 85 p.s.i.g. at 70° F. is generally created. In the case of glass and other frangible containers, such pressure should be kept in the range of about 10 to 30 p.s.i.g. at 70° F.

If a metallic aerosol container is used, I prefer to add a small proportion of a suitable corrosion inhibitor to the formulation, for example, about 0.01 to 5.0% by weight of the formulation. Typical inhibitors include oleic acid, N-fatty beta-aminopropionate, N-fatty beta-iminodipropionate, hexynol, morpholine, formaldehyde, etc.

In operation, the formulation is introduced into the aerosol container and confined therein at the vapor pressure of the propellant. When the valve of the container is opened, the pressure on the formulation is released as it emerges from the container, producing a foam of limited stability.

The following examples illustrate the preparation of typical clear, homogeneous liquid formulations coming within the scope of the present invention. These formulations, when dispensed in an aerosol container provided with a foam-dispensing head, produced foams of limited stability. In the examples, all percentages are by weight.

EXAMPLE 1.—AFTER-SHAVE LOTION

*Formulation*

Part A: Weight percent
"Polawax" (a stearyl alcoholethylene oxide condensation product) _____ 1.5
Anhydrous ethyl alcohol _____ 62.1
Part B:
Menthol _____ 0.05
Camphor _____ 0.05
Perfume _____ 0.3
Part C:
"Emcol E-607" (a quaternary ammonium salt) _____ 0.2
Allantoin (a healing agent) _____ 0.1
Distilled water _____ 35.7

Part A was warmed at temperature of 110° to 120° F. to dissolve the "Polawax." It was then cooled to 100° F., and part B was added thereto. Part C was heated to 170° to 180° F. to dissolve the ingredients, cooled to 100° F. and then added to the combined solution of A and B to form a liquid concentrate. The final formulation was prepared by admixing 92 weight percent of this concentrate and 8 weight percent of dichlorodifluoromethane (10%)-dichlorotetrafluoroethane (90%) propellant. The formulation was charged into a glass aerosol container provided with a foam-dispensing head. The pressure exhibited by the formulation in the container was 15 p.s.i.g. at 70° F. When dispensed, the formulation produced a foam of limited stability.

EXAMPLE 2.—HAIR-DRESSING

*Formulation*

Part A: Weight percent
"Makon BXA" (nonyl phenoxy polyoxyethylene) _____ 3.0
Anhydrous ethyl alcohol _____ 56.5
Part B: Perfume _____ 0.5
Part C:
"Ucon 50 HB-5100" (a synthetic lubricant comprising a water-soluble polyalkylene glycol) _____ 3.0
Polyvinyl pyrrolidone-polyvinyl acetate in 50% ethyl alcohol _____ 2.0
Distilled water _____ 35.0

Part A was heated to temperature of 110° F. to dissolve the "Makon BXA." It was then cooled to 100° F., and part B was added. Part C was heated to temperature of 100° F. and was then added to the combined solution of A and B to form a liquid concentrate. The final formulation was prepared by admixing 92 weight percent of this concentrate and 8 weight percent of dichlorodifluoromethane (20%)-dichlorotetrafluoroethane (80%) propellant. The formulation was charged into a glass aerosol container provided with a foam-dispensing head. The pressure exhibited by the formulation in the container was 24 p.s.i.g. at 70° F. When dispensed, the formulation produced a foam of limited stability.

EXAMPLE 3.—SUN SCREEN LOTION

*Formulation*

Weight percent
Diglycol oleate _____ 5.0
Anhydrous ethyl alcohol _____ 55.0
Oleic acid _____ 1.5
Dipropylene glycol salicylate _____ 3.0
Perfume _____ 0.5
Distilled water _____ 35.0

The diglycol oleate was dissolved in the alcohol at temperature of 110° F. While maintaining this temperature, the rest of the ingredients were added to form a liquid concentrate. The final formulation was prepared by admixing 92 weight percent of this concentrate and 8 weight percent of dichlorodifluoromethane propellant. The formulation was charged into a metal aerosol container provided with a foam-dispensing head. The pressure exhibited by the formulation in the container was 60 p.s.i.g. at 70° F. When dispensed, the formulation produced a foam of limited stability.

EXAMPLE 4.—NAIL POLISH REMOVER

*Formulation*

Weight percent
"Myrj 45" (polyoxyethylene stearate) _____ 2.5
Anhydrous ethyl alcohol _____ 21.5
Lauric diethanolamide _____ 1.0
Acetone _____ 35.0
Ethyl acetate _____ 5.0
Distilled water _____ 35.0

The "Myrj 45" was dissolved in the ethyl alcohol at temperature of 110° F. While maintaining the temperature at 110° F., the rest of the ingredients were added to form a liquid concentrate. The final formulation was prepared by admixing 92 weight percent of this concentrate and 8 weight percent of dichlorodifluoromethane (60%)–dichlorotetrafluoroethane (40%) propellant. The formulation was charged into a glass aerosol container provided with a foam-dispensing head. The pressure exhibited by the formulation in the container was 30 p.s.i.g. at 70° F. When dispensed, the formulation produced a foam of limited stability.

EXAMPLE 5.—WAVE SET

*Formulation*

| | Weight percent |
|---|---|
| "Polawax" | 1.5 |
| Anhydrous ethyl alcohol | 57.5 |
| "Ethoxylan 100" (lanolin alcohol) | 0.5 |
| Polyvinyl pyrrolidone | 5.0 |
| Morpholine | 0.5 |
| Water | 35.0 |

The "Polawax" was dissolved in the ethyl alcohol at temperature of 110° F. While maintaining the temperature at 110° F., the rest of the ingredients were added to form a liquid concentrate. The final formulation was prepared by admixing 98 weight percent of this concentrate and 2 weight percent of propane (13%)–isobutane (87%) propellant. The formulation was charged into a metal aerosol container provided with a foam-dispensing head. The pressure exhibited by the formulation in the container was 35 p.s.i.g. at 70° F. When dispensed, the formulation produced a foam of limited stability.

EXAMPLE 6.—BODY COLOGNE

*Formulation*

| | Weight percent |
|---|---|
| "Polawax" | 1.5 |
| Anhydrous ethyl alcohol | 58.5 |
| Perfume | 2.0 |
| Water | 38.0 |

The "Polawax" was dissolved in the ethyl alcohol at temperature of 110° F. While maintaining the temperature at 110° F., the rest of the ingredients were added to form a liquid concentrate. The final formulation was prepared by admixing 97 weight percent of this concentrate and 3 weight percent of isobutane propellant. The formulation was charged into a glass aerosol container provided with a foam-dispensing head. The pressure exhibited by the formulation in the container was 10 p.s.i.g. at 70° F. When dispensed, the formulation produced a foam of limited stability.

After standing for weeks, formulations produced in accordance with the above examples remained clear and homogeneous.

Although the invention has been described in detail and exemplified by a number of examples, it will be apparent that many changes and modifications may be made within the principles of the invention. Thus, as indicated above, part of the alcohol and water components may be replaced with acetone and glycerine, respectively, in producing foams of limited stability.

I claim:

1. An aerosol container provided with a foam-dispensing head and containing a homogeneous liquid composition for use in forming a foam of limited stability consisting essentially of, by weight, 46 to 66% saturated aliphatic monohydric alcohol containing 1 to 3 carbon atoms, 28 to 42% water, 0.5 to 5% surface active agent of the group consisting of anionic, non-ionic and cationic surface active agents and 2 to 15% liquefied normally gaseous propellant, each of the surface active agent and propellant being soluble in either the alcohol or water but not in both, said composition being confined in the container under the vapor pressure of the propellant.

2. An aerosol container provided with a foam-dispensing head and containing a homogeneous liquid composition for use in forming a foam of limited stability consisting essentially of, by weight, 46 to 66% ethyl alcohol, 28 to 42% water, 0.5 to 5% surface active agent of the group consisting of anionic, non-ionic and cationic surface active agents and 2 to 15% liquefied normally gaseous propellant, each of said surface active agent and propellant being soluble in either the alcohol or water but not in both, said composition being confined in the container under the vapor pressure of the propellant.

3. An aerosol container provided with a foam-dispensing head and containing a homogeneous liquid composition for use in forming a foam of limited stability consisting essentially, by weight, 46 to 66% ethyl alcohol, 28 to 42% water, 0.5 to 5% non-ionic surface active agent and 2 to 15% liquefied normally gaseous propellant, each of said surface active agent and propellant being soluble in either the alcohol or water but not in both, said composition being confined in the container under the vapor pressure of the propellant.

4. An aerosol container provided with a foam-dispensing head and containing a homogeneous liquid composition for use in forming a foam of limited stability consisting essentially of, by weight, 46 to 66% ethyl alcohol, 28 to 42% water, 0.5 to 5% surface active agent of the group consisting of anionic, non-ionic and cationic surface active agents and 3 to 15% chlorofluorinated saturated aliphatic hydrocarbon propellant, each of said surface active agent and propellant being soluble in either the alcohol or water but not in both, said composition being confined in the container under the vapor pressure of the propellant.

5. An aerosol container provided with a foam-dispensing head and containing a homogeneous liquid composition for use in forming a foam of limited stability consisting essentially of, by weight, 46 to 66% ethyl alcohol, 28 to 42% water, 0.5 to 5% non-ionic surface active agent and 3 to 15% chlorofluorinated saturated aliphatic hydrocarbon propellant, each of said surface active agent and propellant being soluble in either the alcohol or water but not in both, said composition being confined in the container under the vapor pressure of the propellant.

6. An aerosol container provided with a foam-dispensing head and containing a homogeneous liquid composition for use in forming a foam of limited stability consisting essentially of, by weight, 46 to 66% ethyl alcohol, 28 to 42% water, 0.5 to 5% surface active agent formed by reaction of a fatty alcohol and ethylene oxide and 3 to 15% chlorofluorinated saturated aliphatic hydrocarbon propellant, each of said surface active agent and propellant being soluble in either the alcohol or water but not in both, said composition being confined in the container under the vapor pressure of the propellant.

7. An aerosol container provided with a foam-dispensing head and containing a homogeneous liquid composition for use in forming a foam of limited stability consisting essentially of, by weight, 46 to 66% mixture of saturated aliphatic monohydric alcohol containing 1 to 3 carbon atoms and acetone, 28 to 42% water, 0.5 to 5% surface active agent of the group consisting of anionic, non-ionic and cationic surface active agents and 2 to 15% propellant, each of said surface active agent and liquefied normally gaseous propellant being soluble in either the mixture of alcohol and acetone or water but not in both, said composition being confined in the container under the vapor pressure of the propellant.

8. An aerosol container provided with a foam-dispensing head and containing a homogeneous liquid composition for use in forming a foam of limited stability consisting essentially of, by weight, 46 to 66% saturated aliphatic monohydric alcohol containing 1 to 3 carbon atoms, 28 to 42% mixture of water and glycerine, 0.5 to 5% surface active agent of the group consisting of anionic, non-ionic and cationic surface active agents and 2 to 15% liquefied normally gaseous propellant, each of said surface active agent and propellant being soluble in either the alcohol or the mixture of water and glycerine but not in both, said composition being confined in the container under the vapor pressure of the propellant.

References Cited in the file of this patent

UNITED STATES PATENTS

| | | |
|---|---|---|
| 2,655,480 | Spitzer et al. | Oct. 13, 1953 |
| 2,742,321 | Mina et al. | Apr. 17, 1956 |
| 2,879,231 | Allen et al. | Mar. 24, 1959 |
| 2,908,650 | Fine | Oct. 13, 1959 |
| 3,092,555 | Horn | June 4, 1963 |

FOREIGN PATENTS

| | | |
|---|---|---|
| 59,548 | Argentina | Aug. 16, 1947 |

OTHER REFERENCES

Soap and Chemical Specialties, May 1960, pages 202 and 205.